(12) United States Patent
Krajewski et al.

(10) Patent No.: US 11,331,992 B2
(45) Date of Patent: May 17, 2022

(54) ELECTRIC AXLE DRIVE DEVICE FOR A MOTOR VEHICLE, AND ASSOCIATED UTILITY VEHICLE

(71) Applicant: DAIMLER AG, Stuttgart (DE)

(72) Inventors: Christian Krajewski, Neuhausen (DE); Guenter Niebauer, Hochdorf (DE); Florian Vincon, Stuttgart (DE)

(73) Assignee: DAIMLER AG, Stuttgart (DE)

( * ) Notice: Subject to any disclaimer, the term of this patent is extended or adjusted under 35 U.S.C. 154(b) by 297 days.

(21) Appl. No.: 16/634,417

(22) PCT Filed: Jun. 25, 2018

(86) PCT No.: PCT/EP2018/066878
§ 371 (c)(1),
(2) Date: Jan. 27, 2020

(87) PCT Pub. No.: WO2019/020297
PCT Pub. Date: Jan. 31, 2019

(65) Prior Publication Data
US 2020/0171929 A1   Jun. 4, 2020

(30) Foreign Application Priority Data

Jul. 27, 2017   (DE) .................... 10 2017 007 081.4

(51) Int. Cl.
*B60K 1/02*        (2006.01)
*B60K 17/16*       (2006.01)
(Continued)

(52) U.S. Cl.
CPC .................. *B60K 1/02* (2013.01); *B60K 1/00* (2013.01); *B60K 17/08* (2013.01); *B60K 17/12* (2013.01);
(Continued)

(58) Field of Classification Search
CPC .......... F16H 48/20; F16H 48/36; F16H 48/08; F16H 48/22; F16H 37/082; F16H 3/46;
(Continued)

(56) References Cited

U.S. PATENT DOCUMENTS 6,387,004 B1 * 5/2002 Parrish .................. B60W 10/26
475/5
7,309,300 B2 12/2007 Garnett et al.
(Continued)

FOREIGN PATENT DOCUMENTS

DE    112006003153 T5    10/2008
DE    102009033531 A1     1/2011
(Continued)

OTHER PUBLICATIONS

International Search Report dated Nov. 7, 2018 in related/corresponding International Application No. PCT/EP2018/066878.
(Continued)

*Primary Examiner* — Tinh Dang
(74) *Attorney, Agent, or Firm* — Patent Portfolio Builders PLLC (57) ABSTRACT

An electrical axle drive device includes at least one first electrical machine, which has a stator and a rotor rotatable around a machine axis of rotation relative to the stator. A gear unit is drivable by the first electrical machine having at least one first planetary gear stage drivable by the first electrical machine and at least one first spur gear stage drivable by the first electrical machine. The device also includes at least one drive wheel of the motor vehicle being able to be rotated around a wheel axis of rotation running parallel to the machine axis of rotation and being drivable by the first electrical machine via the gear unit. The first electrical machine is arranged at least partially on a first side of the longitudinal central plane with respect to a longitu-
(Continued)

dinal central plane of the vehicle that is spanned by the vehicle vertical direction and the vehicle longitudinal direction and the first spur gear stage is arranged on a second side of the longitudinal central plane opposite the first side in the vehicle transverse direction.

13 Claims, 4 Drawing Sheets (51) Int. Cl.
*F16H 3/46* (2006.01)
*F16H 48/08* (2006.01)
*F16H 48/20* (2012.01)
*B60K 1/00* (2006.01)
*B60K 17/08* (2006.01)
*B60K 17/12* (2006.01)
*B60K 23/04* (2006.01)

(52) U.S. Cl.
CPC .............. *B60K 17/16* (2013.01); *B60K 23/04* (2013.01); *F16H 3/46* (2013.01); *F16H 48/08* (2013.01); *F16H 48/20* (2013.01); *B60K 2001/001* (2013.01); *B60K 2023/046* (2013.01)

(58) Field of Classification Search
CPC . B60K 1/02; B60K 1/08; B60K 17/12; B60K 17/17; B60K 23/04
See application file for complete search history.

(56) References Cited

U.S. PATENT DOCUMENTS

| | | | |
|---|---|---|---|
| 8,640,801 B2 | 2/2014 | Hennings et al. | |
| 8,734,281 B2 * | 5/2014 | Ai | B60K 6/365 475/5 |
| 9,453,564 B1 | 9/2016 | Pritchard et al. | |
| 10,094,457 B2 | 10/2018 | Pritchard et al. | |
| 2005/0023053 A1 | 2/2005 | Bennett | |
| 2009/0098969 A1 | 4/2009 | Tabata et al. | |
| 2010/0285914 A1 * | 11/2010 | Wenthen | F16H 3/64 475/150 |
| 2011/0094807 A1 | 4/2011 | Pruitt et al. | |
| 2011/0259657 A1 | 10/2011 | Fuechtner | |
| 2014/0287863 A1 * | 9/2014 | Tanaka | H02K 7/116 475/156 |
| 2019/0017573 A1 | 1/2019 | Schilder et al. | |

FOREIGN PATENT DOCUMENTS

| | | |
|---|---|---|
| DE | 102010017966 A1 | 10/2011 |
| DE | 102012024752 A1 | 6/2014 |
| DE | 102015101042 A1 | 7/2016 |
| DE | 102015208825 A1 | 11/2016 |
| DE | 102017104674 A1 | 9/2017 |
| WO | 2017089449 A1 | 6/2017 |
| WO | 2017108168 A1 | 6/2017 |

OTHER PUBLICATIONS

Search Report dated Apr. 16, 2018 in related/corresponding DE Application No. 10 2017 007 081.4.
Written Opinion dated Nov. 7, 2018 in related/corresponding International Application No. PCT/EP2018/066878.

* cited by examiner

ELECTRIC AXLE DRIVE DEVICE FOR A MOTOR VEHICLE, AND ASSOCIATED UTILITY VEHICLE

BACKGROUND AND SUMMARY OF THE INVENTION

Exemplary embodiments of the invention relate to an electrical axle drive device for a motor vehicle, as well as a motor vehicle having such an electrical axle drive device.

Such an electrical axle drive device for a motor vehicle is, for example, already known from DE 10 2009 033 531 A1, U.S. Pat. No. 9,453,564, and WO 2017/108168. The electrical axle drive device has at least one drive wheel rotatable around a wheel axis of rotation, as well as at least one electrical machine with a stator and a rotor. The rotor is additionally rotatable around a machine axis of rotation relative to the stator, wherein the machine axis of rotation runs parallel to the wheel axis of rotation. The electrical axle drive device additionally has a gear unit drivable by the first electrical machine, the gear unit having at least one first planetary gear stage and at least one first gear stage drivable by the first electrical machine. The first gear stage in turn has a first spur gear and a second spur gear that meshes with the first spur gear, which is, for example, drivable via the first spur gear and the first planetary gear by the first electrical machine. Additionally, the drive wheel, whose wheel axis of rotation runs parallel to the machine axis of rotation, is drivable by the first electrical machine via the gear unit, so that, for example, the motor vehicle can be electrically driven by the electrical machine as a whole.

US 2005/0 023 053 A1 discloses an electrical axle drive device in which an electrical machine is arranged at least partially on a first side of the longitudinal central plane with respect to a longitudinal central plane of a motor vehicle that is spanned by a vehicle vertical direction and a vehicle longitudinal direction; and a spur gear stage is arranged on a second, opposite side of the longitudinal central plane (66) in a transverse direction. Similar, at least in passing, is known from DE 10 2015 208 825 A1 and DE 10 2017 104 674 A1 (post-published).

US 2009/0 098 969 A1 disclose a hybrid powertrain in which several planetary gear stages and two spur gear stages are arranged between an electrical machine and an axle drive.

Finally, U.S. Pat. No. 9,453,564 B1 discloses an electrical axle drive device in which, in addition to the features listed above, exactly two planetary gear stages and exactly two spur gear stages are provided.

Exemplary embodiments of the present invention is directed to further development an electrical axle drive device and a motor vehicle according to the aforementioned in such a way that a particularly advantageous operation as well as a particularly compact construction method of the electrical axle drive device can be implemented simultaneously.

According to embodiments, the electrical axle drive device has an axle drive that is drivable by the gear unit of the electrical machine, by which the drive wheel may be driven by the first electrical machine. As a result, a particularly advantageous operation may be implemented, because the at least one drive wheel particularly advantageously, in particular with a particularly advantageous transmission, can be driven by the electrical machine. In particular, it is possible that the at least one drive wheel and at least one second drive wheel may be driven by the axle drive and the gear unit of the electrical machine, wherein the previous and following statements regarding the at least one drive wheel can be easily also applied to the at least one second drive wheel and vice versa. The drive wheels can, for example, be allocated in particular to a rear axle or a front axle, so that the axle or the drive wheels of the axle can be driven particularly advantageously by means of the electrical machine, in particular via the axle drive and the gear unit. Here, the axle drive is preferably constructed as a differential or a differential gear, in particular as a bevel-gear differential, so that a particularly advantageous operation may be implemented. As is common knowledge from differential gears or bevel-gear differentials, the differential gear allows, for example, rotational speed differences or a speed compensation between the drive wheels, in particular during cornering, so that the drive wheel on the outside of the corner with a higher rotational speed than the drive wheel on the inside of the corner can rotate without resulting in an excessive distortion of the axle drive device. As a result, a particularly advantageous operation may be implemented.

In order to simultaneously implement a particular compact construction method of the electrical axle drive, and, in doing so, be able to keep the installation space requirement of the electrical axle drive as low as possible, the first electrical machine—in particular in relation to an installation position of the electrical axle drive—is arranged at least partially on a first side of the longitudinal central plane with respect to a longitudinal central plane of the motor vehicle that is spanned by the vehicle vertical direction and the vehicle longitudinal direction, wherein the first spur gear stage is arranged on one of the second sides of the longitudinal central planes opposite one of the first sides in a transverse direction. The electrical axle drive device assumes its installation position in the completely manufactured state of the motor vehicle, wherein the electrical axle drive device in the completely manufactured state of the motor vehicle is mounted on the motor vehicle, in particular at least indirectly mounted to a body or a frame of the motor vehicle. In the completely manufactured state of the motor vehicle, this stands, for example, on a horizontal plane, so that the longitudinal central plane is a vertical longitudinal central plane, which, in the completely manufactured state of the motor vehicle, runs at least substantially perpendicularly to the vehicle transverse direction, to the horizontal or to the horizontal plane.

Thus, the longitudinal central plane is also denoted as the vertical longitudinal central plane or as the vertical vehicle longitudinal central plane. In particular, the following can be understood by the longitudinal central plane: The motor vehicle, in particular the axle drive device, has in its completely manufactured state a—in particular in relation to the installation position—a width running in a vehicle transverse direction, wherein, for example, the middle of this width lies in the longitudinal central plane. Starting from the middle, or starting from the longitudinal central plane, the motor vehicle or the electrical axle drive device extends around a first stretch to the outer left in a vehicle transverse direction and around a second stretch to the outer right in a vehicle transverse direction, wherein the first stretch corresponds to the second stretch or vice versa, i.e., wherein the stretches are the same. In this way, the motor vehicle or the electrical axle drive device is not necessarily symmetrically designed in relation to the longitudinal central plane, so that the longitudinal central plane is not necessarily a symmetry plane of the motor vehicle or of the electrical drive device.

Here, the gear unit has a second planetary gear stage, whereby a particularly advantageous transmission of the gear unit as a whole can be achieved in a space and weight-efficient manner. The at least one drive wheel or the drive wheels can thereby be driven particularly effectively, so that a particularly advantageous operation can be implemented.

As a whole, the gear unit has exactly two planetary gear stages and exactly two spur gear stages.

According to the invention it is provided that, in relation to a torque flow from the electrical machine to the at least one drive wheel, the first planetary gear stage is arranged after the electrical machine and before the drive wheel, the first spur gear stage after the first planetary gear stage and before the drive wheel, the second planetary gear stage after the first spur gear stage and before the at least one drive wheel and the second spur gear stage after the second planetary gear stage and before the at least one drive wheel. It was found that a particularly advantageous overall transmission of the gear unit or of the axle drive device can be implemented by this arrangement of the planetary gear stages and of the spur gear stages, so that the at least one drive wheel can be driven particularly advantageously with the simultaneous feasibility of a compact construction, that is to say low outer dimensions of the axle drive device.

Additionally, according to the invention, it has been shown to be particularly advantageous when at least one braking element is provided, by means of which a gear element of the second planetary gear stage is fixable to a housing of the gear unit. The respective planetary gear stage has, for example, a sun gear as a first gear element, an internal gear as a second gear element and at least one planetary gear carrier as a third gear element. Further, the respective planetary gear stage has at least one planetary gear which, for example, meshes with the respective sun gear and with the respective internal gear and is rotatably attached to the planetary carrier. By means of the at least one braking element, at least one of the gear elements of the second planetary gear stage can therefore be fixed to the housing of the gear unit, wherein the gear elements of the second planetary gear stage can be accommodated in the aforementioned housing. The braking element is, for example, switchable, in particular moveable, between at least one braking state or between at least one braking position and at least one release state or a release position. The respective gear elements of the respective planetary gear stage, in particular of the secondary planetary gear stage, are for example rotatable around a common main axis of rotation relative to the housing, in particular in the case when the braking element is in the release state or in the release position and when, for example, the second planetary gear stage is being driven.

In other words, the braking element permits, in its release state or in its release position, a rotation of the one gear element of the second planetary gear stage around the main axis of rotation relative to the housing, so that at least the one gear element of the second planetary gear stage is rotated around the main axis of rotation relative to the housing when the second planetary gear stage is driven. If, however, the braking element is in its braking position or in its braking state, the one gear element of the second planetary gear stage is fixed, in particular, against rotation to the housing by means of the braking element, so that the one gear element of the second planetary gear stage in particular cannot rotate around the main axis of rotation relative to the housing when the second planetary gear stage is driven, that is to say when torques are introduced into the second planetary gear stage. The braking element thus enables the one gear element of the second planetary gear stage to be locked and released as needed, in particular fixed against rotation, so that a switching of the second planetary gear stage is implemented or can be implemented. In this way the second planetary gear stage is designed as a switchable planetary gear train, so that for example at least two transmissions which differ from one another are achievable, via which the at least one drive wheel can be driven by the electrical machine. Here, the transmissions can be switched by the braking element being switchable or moveable between the release state and the braking state. In addition, alternatively or additionally, a neutral position or a neutral state can be represented as idling.

In order to implement the braking element particularly weight and space-efficiently, it is further provided according to the invention that the braking element has the internal gear of the second planetary gear stage or is designed as the internal gear of the second planetary gear stage, wherein the internal gear of the second planetary gear stage can be shifted in the axial direction of the second planetary gear stage relative to the housing in order to thereby switch the braking element between the release position and the braking position. The axial direction of the second planetary gear stage thus coincides with the main axis of rotation of the second planetary gear stage. In this embodiment, the internal gear fulfils a double function, in that on the one hand it can be used for the implementation of at least one advantageous transmission and, on the other hand, can be used as the braking element described.

The totality of the invention ensures that a high-performance electrical axle drive device is achieved as well as an electrical axle drive device which, on the basis of a classical non-electrical axle drive device, leads to a very compact assembly in spite of extreme structural restrictions.

In a particularly advantageous embodiment of the invention, at least one locking element is provided, by means of which at least two of the gear elements of the secondary planetary gear stage are lockable with one another. The locking element is, for example, switchable, in particular moveable, between at least one locking state or at least one locking position and at least one release state or at least one locking position. In the locking state or in the locking position, the two gear elements of the second planetary gear stage are locked with one another by means of the locking element, that is to say connected in a manner fixed against rotation, so that the second gear elements of the second planetary gear stage function as a block, i.e., run together around the main axis of rotation, in particular when the second planetary gear stage is driven. In other words, in the locking state of the locking element, the two gear elements rotate together around the main axis of rotation relative to the housing when the second planetary gear stage is driven. In the release state or in the release position, the locking element releases the second gear elements of the second planetary gear stage, in particular for a relative rotation to one another around the main axis of rotation, so that the second gear elements can rotate around the main axis of rotation relative to another and relative to the housing, in particular when the second planetary gear stage is driven. In this way, the transmissions described above differing from another can be achieved in a particularly space and weight-efficient manner, since the second planetary gear stage is or can be, for example, designed as a switchable planetary gear train by introducing the locking element.

In order to be able to represent a particularly compact method of construction, it is provided in a further embodiment of the invention that the second planetary gear stage is arranged at least partially, in particular at least predominantly or completely, on the second side of the longitudinal central plane.

In a particularly advantageous embodiment of the invention, the second spur gear stage is at least substantially arranged in or on the longitudinal central plane. This means, in particular, that the longitudinal central plane reaches through respective spur gears that mesh with one another of the second spur gear stage so that, for example, the spur gears of the second spur gear stage are arranged in relation to the vehicle transverse direction at least substantially in the middle of the axle drive device or of said axis.

In order to be able to keep the installation space requirement of the electrical drive device particularly small, in a further embodiment of the invention the electrical machine is arranged with least to two thirds of its volume, in particular external volume, or its external dimensions on the first side of the longitudinal central plane.

A further embodiment is characterized in that a second electrical machine and a further spur gear, the spur gear being drivable by the second electrical machine and meshing with the second spur gear are provided. The second electrical machine can thus provide torques as drive torques, which, for example, are transferred via the further spur gear to the second spur gear of the first spur gear stage and can thus be introduced to the gear unit. Thus, the second electrical machine can be coupled with the second spur gear of the first spur gear stage via the further spur gear, wherein the respective spur gear stage can also be denoted as a spur gear stage. The respective planetary gear stage is also denoted as a planetary stage, planetary train or planetary gear train.

Here, the at least one drive wheel is drivable by means of the two electrical machines, as the respective electrical machines can provide at least one respective torque as a drive torque for driving the at least one drive wheel. The first electrical machine can, for example, provide its driving torque via the first spur gear of the first spur gear stage, wherein the second electrical machine can provide its drive torque via the further spur gear. The respective drive torques provided by the respective electrical machines are transferred to the second spur gear and are integrated on the second spur gear, so that a particularly advantageous and compact drive can be achieved.

In order to be able to keep the installation space requirement particularly low, it is provided in a further embodiment of the invention that the second electrical machine is aligned with the first electrical machine along a direction running perpendicular to the vehicle transverse direction and thus, for example, at least substantially parallel to the longitudinal central plane. The second electrical machine has, for example, a second stator and a second rotor that is rotatable around a second machine axis of rotation relative to the second stator. Here, it is preferably provided that the second machine axis of rotation is axially offset from the first machine axis of rotation, wherein the respective machine axis of rotation is preferably axially offset from the wheel axis of rotation. It is additionally preferably provided that the machine axes of rotation lie in a common plane, which, for example, runs parallel to the vehicle vertical direction or parallel to the longitudinal central plane or coincides with the longitudinal central plane. The wheel axes of rotation and the respective machine axis of rotation preferably run at least substantially in the vehicle transverse direction.

A further embodiment is characterized by the first planetary gear stage, the first electrical machine and the first spur gear stage being arranged in a common housing, in particular in the housing named above, wherein the housing is arranged respectively in equal parts on the first side and on the second side of the longitudinal central plane. In this way, a compact construction method can be achieved. In addition, the first planetary gear stage, the first electrical machine and the first spur gear stage as well as the common housing containing said elements create a module which can be handled and mounted simply and cost-effectively.

In order to implement a particularly advantageous construction method, it has been shown to be particularly advantageous when an oil cooler and/or power electronics is or are mounted on a side of the first electrical machine facing away from the axle drive or on a side of the axle drive device facing away from the first electrical machine.

In order to keep the installation space requirement particularly low, the second electrical machine is arranged with respect to a further plane of the motor vehicle spanned by the vehicle transverse direction and the vehicle longitudinal direction on a third side of the further plane, wherein the first electrical machine is arranged on a third side opposite the fourth side in a vehicle vertical direction. For example, the electrical machines are arranged one on top of the other in the vehicle vertical direction, wherein, for example, one of the electrical machines is covered at least partially, in particular at least predominantly or completely by the other electrical machine upwards in the vehicle vertical direction, so that, for example, the other electrical machine is covered at least partially, in particular at least predominantly or completely by an electrical machine downwards in the vehicle vertical direction.

The invention also includes a motor vehicle, in particular a utility vehicle, having at least one electrical axle drive device according to the invention. Advantages and advantageous embodiments of the axle drive device according to the invention are to be considered as advantages and advantageous embodiments of the motor vehicle according to the invention and vice versa.

Here, it has been shown to be particularly advantageous when the motor vehicle has at least two longitudinal carriers, which are, for example, separated from one another in the vehicle transverse direction and stretch at least substantially in the vehicle transverse direction. In this way, all of the components of the axle drive device are arranged in a vehicle transverse direction between the longitudinal carriers. The longitudinal carriers are, for example, a component of a frame of the motor vehicle that designed, for example, as a utility vehicle, wherein the frame comprises at least one cross-carrier, by which the longitudinal carriers are, for example, connected to one another.

The invention is based in particular on the following insight: the placing of an electrical drive, i.e., an electrical drive device on an axle of a motor vehicle that is designed, for example, as a front axle or rear axle in an existing construction space can be demanding, since normally only a very small construction space is available. According to the invention, a particularly compact construction method can be implemented, however, so that the electrical drive device functioning as an electrical drive, including a particularly advantageous transmission, the transmission being represented by the gear unit as well as by the axle drive, for example, can be integrated particularly advantageously in a given frame also denoted as a dead frame, and in particular can be integrated between the longitudinal carrier and between any bellows provided. Normally, such an integration is a problem to the extent that, for driving dynamics reasons, a large transmission or gear reduction with a value of up to 70 is desirable. The gear reduction or transmission is usually denoted by i, wherein it will preferably apply that i is of a value up to 70. Normally, in order to implement such a high transmission or gear reduction, a correspondingly large construction space is required. According to the invention, such a compact construction method of the electrical axle drive device can be now implemented, that, for example, pre-existing axle bridges, in particular rear-axle bridges, can be applied and thus maintained without changes or with only very small changes.

In particular, due to the use of the braking element and the locking element, at least two switchable transmissions as well as a neutral position of the gear unit or of the axle drive device can be represented as a whole, and this in a particularly space-efficient manner. Via the second spur gear stage, wherein the respective spur gear stage is also denoted as a spur gear group, the respective drive torque can be transferred to the axle drive preferably designed as a differential. It is additionally possible to position the electrical machines together with the drive in a vehicle longitudinal direction or in a forwards direction of travel in front of or behind the at least one drive wheel or the axis, so that a needs-based position of the respective electrical machine and of the drive device is achievable.

In order to drive the at least one drive wheel, the respective electrical machine is, for example, driven in an engine operation and thus as an electric motor. For this purpose, the electrical machine is, for example, provided with electrical energy or electrical power, which is stored in an energy store. The energy store is, for example, designed as a battery, in particular a high-voltage battery (HV battery). In the axle drive device according to the invention, a compact nesting of the gear unit can be implemented in such a way that the first electrical machine or the two electrical machines as well as the gear unit can be positioned between the longitudinal carriers and any bellows provided. In this way, additional construction space can, for example, be created, in which the energy stores named above, or several such energy stores, can be arranged. As a result, the motor vehicle can carry a particularly high amount of electrical energy for driving the respective electrical machine, so that a particularly high electrical range is achievable, via which the motor vehicle can be driven electrically. In addition, for example, existing axle components and the frame can be kept as a chassis and reused, without any changes or with only small changes.

Due to the possibility described of representing two switchable transmission, a particularly advantageous drive of the at least one drive wheel can be achieved. In addition, the neutral position described is possible, so that, for example, even if the respective electrical machine drives the gear unit, a driving of the at least one drive wheel remains. Due to the different possible positionings of the respective electrical machine of the gear unit, in particular before and after the axle, room for further components such as for example the energy store can be created.

It has additionally been shown to be advantageous if the braking element has the sun gear of the second planetary gear stage or is designed as the sun gear of the second planetary gear stage, wherein the sun gear of the second planetary gear stage designed as the braking element is then designed as a switching sun. The switching sun is thus switchable in an axial direction of the second planetary gear stage relative to the housing and is thus moveable or switchable between the braking state or the braking position and the release state or the release position, in particular relative to the housing. If for example—as described above—the internal gear of the second planetary gear stage is used as the braking element, the internal gear is then designed as a switchable internal gear, since the internal gear can be moved or switched in an axial direction of the second planetary gear stage relative to the housing between the braking position and the release position.

It has additionally been shown to be particularly advantageous when the first planetary gear stage is drivable via the sun gear of the first planetary gear stage by the first electrical machine, and is in particular connected to the first electrical machine. This means, in particular, that the sun gear of the first planetary gear stage is connected or can be connected in a manner fixed against rotation with the first electrical machine, in particular with the rotor of the first electrical machine, wherein in particular the sun gear of the planetary gear stage is preferably arranged coaxially to the rotor of the first electrical machine.

It has additionally been shown to be advantageous when the first planetary gear stage is connected to the first spur gear stage via the planetary carrier of the first planetary gear stage, in particular to the first spur gear of the first spur gear stage. For this purpose, the planetary carrier of the first planetary gear stage can be connected or is connected in a manner fixed against rotation with the first spur gear of the first spur gear stage, for example, wherein the planetary carrier of the first planetary gear stage is preferably arranged coaxially to the first spur gear of the first spur gear stage.

The second spur gear stage comprises, for example, a third spur gear and a fourth spur gear that meshes with the third spur gear, wherein, for example, the at least one drive wheel is drivable via the fourth spur gear by the third spur gear. In this way, for example in relation to the aforementioned torque flow, the third spur gear is arranged after the second planetary gear stage and in front of the at least one drive wheel, wherein the fourth spur gear is arranged after the third spur gear and before the at least one drive wheel.

Here, it has been shown to be advantageous when the second planetary gear stage is connected to the second spur gear stage, in particular to the third spur gear, via the planetary carrier of the second planetary gear stage. For this purpose, the planetary carrier of the second planetary gear stage can be or is, for example, connected in a manner fixed against rotation to the second spur gear stage, in particular to the second spur gear, wherein it is preferably provided that the third spur gear is arranged coaxially to the planetary carrier of the second planetary gear stage.

In a further embodiment, the second planetary gear stage is connected via the sun gear of the second planetary gear stage to the first spur gear stage. For this purpose, the sun gear of the second planetary gear stage is connected or can be connected in a manner fixed against rotation with the second spur gear of the first spur gear stage, wherein it is preferably provided that the sun gear of the second planetary gear stage is arranged coaxially to the second spur gear of the first planetary gear stage.

Alternatively, it has been shown to be particularly advantageous when the second planetary gear stage is connected to the first spur gear stage, in particular to the second spur gear of the first spur gear stage, via the internal gear of the second planetary gear stage. For this purpose, the internal gear of the second planetary gear stage has, for example, a toothing, in particular an outer toothing, through which the second spur gear of the first spur gear stage is produced. In this way, for example, the internal gear of the second planetary gear stage and the spur gears of the first spur gear stage are in a common plane and are thus, for example, arranged in a radial direction of the first spur gear stage one alongside the other or consecutively.

The previous and following statements concerning the switchability of the second planetary gear stage can also be applied readily to the first planetary gear stage and vice versa, so that, alternatively or additionally, it can be provided for the switchability of the second planetary gear stage that the first planetary gear stage is switchable. Thus, for example, at least one second braking element is provided, by means of which one of the gear elements of the first planetary gear stage is fixable to a housing of the gear unit, in particular in a manner fixed against rotation, so that, for example, the previous and following statements regarding the at least one braking element can also be applied to the second braking element, then in relation to the first gear stage, and vice versa.

If, for example, at least one second locking element is provided, by means of which at least two gear elements of the first planetary gear stage are lockable with one another, so that for example the previous and following statements regarding the at least one locking element can be applied to the second locking element, then in relation to the first planetary gear stage and vice versa.

A further embodiment is characterized by a differential lock being assigned to the axle drive, whose function in relation to differential gears is sufficiently known and in particular from the general prior art. Through the use of the differential lock, the axle drive can be further developed to a locking differential. By means of the differential lock, the torque compensation named above can, for example, be limited or stopped, so that the drive gears can be coupled with one another via the differential lock.

Here, it has been shown to be particularly advantageous when the differential lock is at least partially, in particular at least predominantly or completely arranged on the first side of the longitudinal central plane, since sufficient space for a corresponding actuator is available. By means of the actuator, at least one locking element of the differential lock designed, in particular, as an electronic differential lock can be actuated or moved.

The electrical machines form, for example, an interstice, which is also denoted as a spandrel and is also, for example, sufficiently known from the field of architecture. Here, it is preferably provided when implementing a particularly compact method of construction that the third spur gear of the second spur gear stage is at least partially arranged in the interstice formed by the electrical machines, so that, for example, at least one portion of the third spur gear in a radial direction outwards of the third spur gear on a fifth side is covered by the first electrical machine and on a sixth side opposite the fifth side in a radial direction of the third spur gear is covered by the second electrical machine.

The practicability of the neutral position or of the idling described above, in particular by switching or because of the braking element in the release state, the electrical machines can, as described, keep running and, for example, provide torques via their respective rotors, without the at least one drive wheel or the drive wheels being driven by the electrical machines. In this way it is possible to maintain a cooling of the electrical machines while they keep running, yet without the drive wheel being driven. For example, the first planetary gear stage is arranged in an axial direction of the first electrical machine, in particular of the rotor of the first electrical machine, at least partially between the electrical machine and the first spur gear stage, in particular the first spur gear of the first spur gear stage. For example, a reversed arrangement would also be equivalent, wherein, however, the first spur gear stage or the first spur gear of the first spur gear stage is arranged or follows after the first spur gear stage in relation to the torque flow.

Then, for example, the first spur gear of the first spur gear stage is arranged on a hollow shaft or is designed as a hollow shaft, through which, for example, a shaft is guided, via which the first planetary gear stage, in particular the sun gear of the first planetary gear stage, is drivable or is driven by the first electrical machine. As a result, the first spur gear stage, in particular the first spur gear of the first spur gear stage, can be driven by the electrical machine via the first planetary gear stage, although the first spur gear stage, in particular the first spur gear of the first spur gear stage, is at least partially arranged in an axial direction of the first electrical machine, in particular of the rotor of the first electrical machine at least partially between the first electrical machine and the first planetary gear stage. Further, for example, a particularly long shaft to the first spur gear stage, in particular to the first spur gear, is conceivable, whereupon, in particular below, the two planetary gear stages are, for example, arranged one behind the other on a common axis. The respective spur gear stage is also denoted as a spur gear set.

Particularly advantageously, the electrical axle drive device has a conventional rigid axle device. Through the conception of the axle drive device, it is possible to provide a partial housing, which is designed to house the first electrical machine, the second electrical machine, the first planetary gear stage, the first spur gear stage, the second planetary gear stage, and the second spur gear stage. The partial housing advantageously has a flange, which is connected or can be connected to a conventional second flange of the axle drive. The flange of the partial housing and the second flange of the axle drive have a common connecting surface in a mounted state which is arranged perpendicularly to the vehicle longitudinal direction.

Further advantages, features and details of the invention arise from the following description of preferred exemplary embodiments as well as with the aid of the drawings. The features and feature combinations described in the description above as well as the features and feature combinations shown below in the description of the figures and/or shown solely in the figures are applicable not only in the respectively specified combination, but also in other combinations or on their own, without exceeding the scope of the invention.

BRIEF DESCRIPTION OF THE DRAWING FIGURES

The drawing shows.

Identical or functionally identical elements are provided with identical reference numerals are provided in the figures.

DETAILED DESCRIPTION

Figure 1:
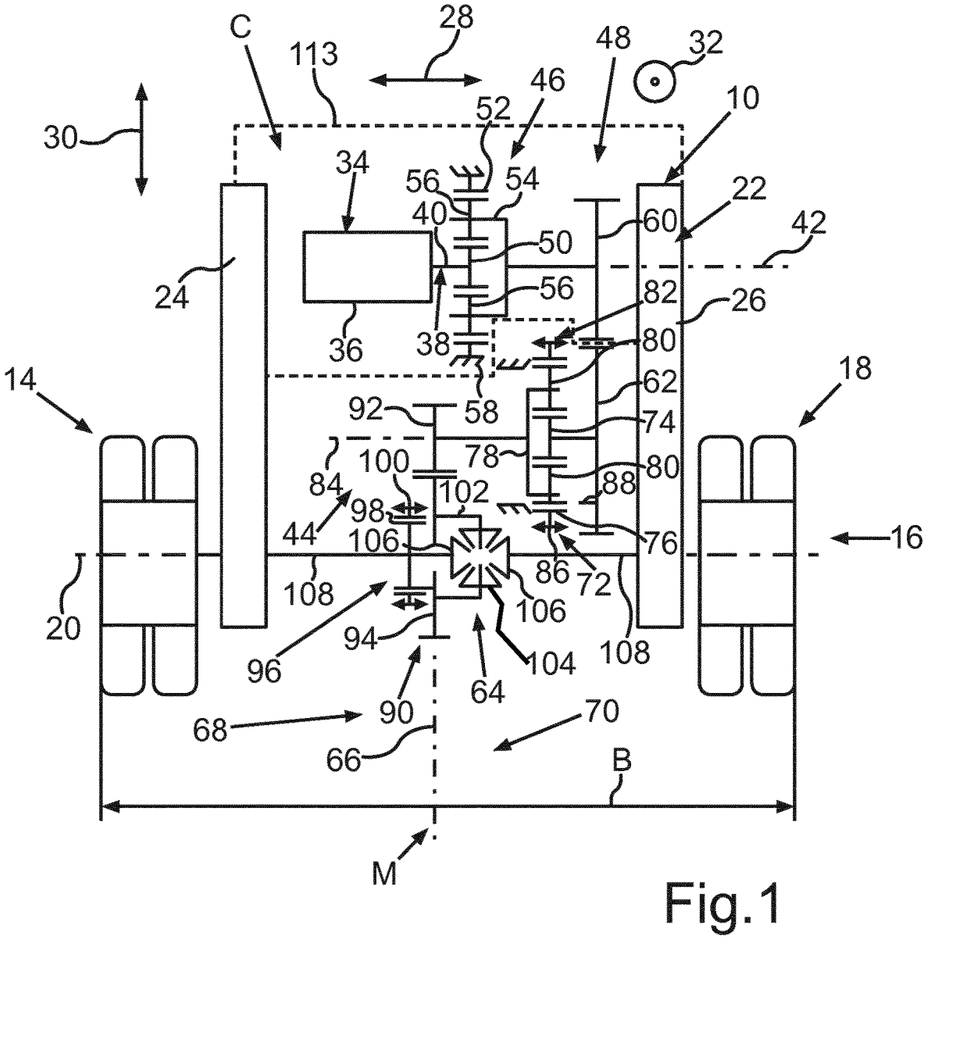
FIG. 1 a schematic representation of an electrical axle drive device according to the invention according to a first exemplary embodiment.
Figure 5:
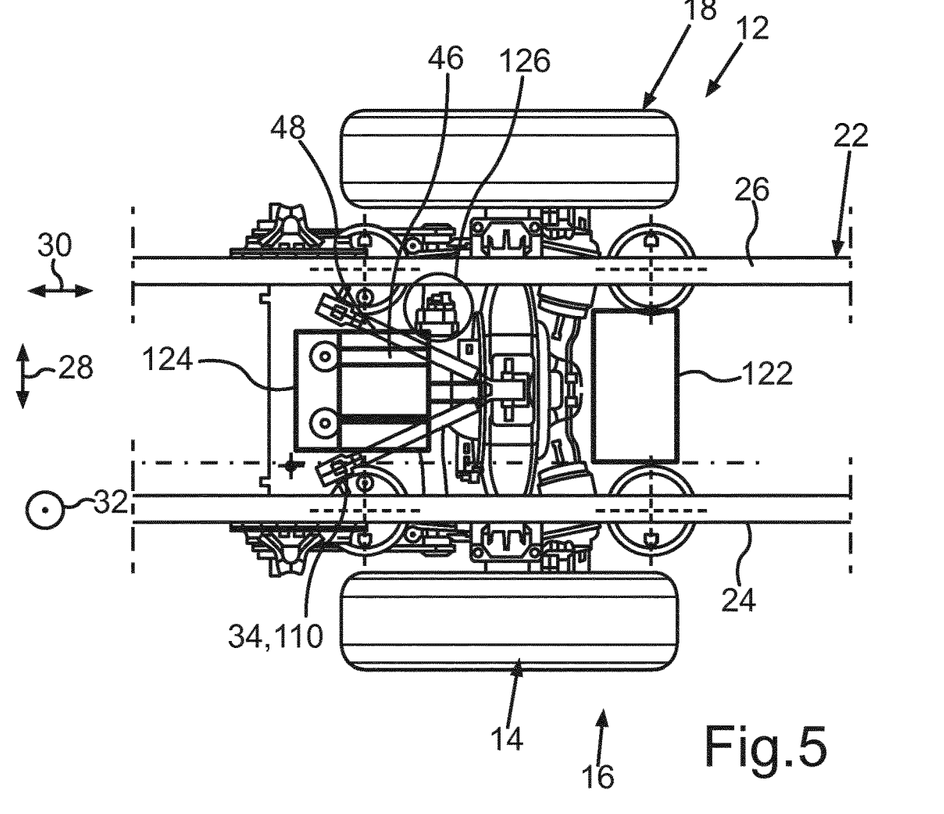
FIG. 5 a sectional, schematic plan view of a motor vehicle designed as a utility vehicle, which has at least one electrical axle drive device.
Figure 6:
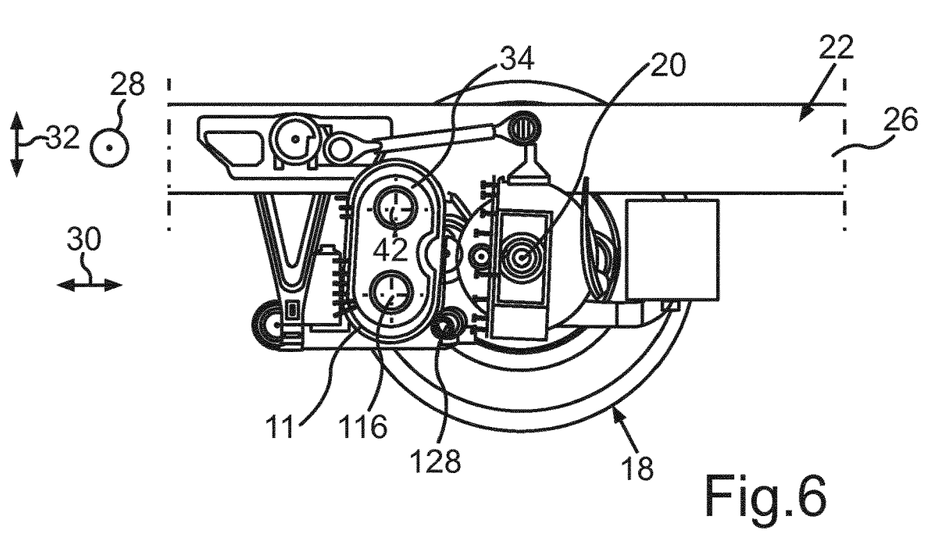
FIG. 6 a sectional, schematic side view of the motor vehicle.

FIG. 1 shows, in a schematic representation, a first embodiment of an electrical axle drive device 10 for a partially recognizable motor vehicle numbered with 12 in FIGS. 5 and 6, which is designed as a utility vehicle. The electrical axle device 10 comprises, for example, at least one drive wheel 14 of the motor vehicle 12, wherein the drive wheel 14 is, for example, designed as an auxiliary double wheel or has, for example, a twin tire. It can be recognized from FIG. 1 that the drive wheel 14 can be attributed to an axle 16 of the motor vehicle 12 designed, for example, as a rear axle or front axle, wherein the axle 16 can be a component of the electrical axle drive device 10. The axle 16 comprises the drive wheel 14 as well as a second drive wheel 18, which can also be designed as an auxiliary double wheel or can have a twin tire. The drive wheels 14 and 18 can thus be arranged separated apart from one another in a vehicle transverse direction and are rotatable around respective coincident wheel axes of rotation 20, which at least substantially run in a vehicle transverse direction, in particular relative to a frame 22 of the utility vehicle (motor vehicle 12) also indicated as an undercarriage or chassis. Here, the frame 22 comprises at least two longitudinal carriers 24 and 26 that are separated apart from one another in a vehicle transverse direction, which are, for example, connected via a cross member of the frame 22 not illustrated in the figure. The vehicle transverse direction 28 is shown in FIG. 1 via a double arrow, wherein the vehicle longitudinal direction 30 is shown via a double arrow.

The vehicle vertical direction 32 is shown via an arrow and runs perpendicularly to the vehicle transverse direction and to the vehicle longitudinal direction, wherein the vehicle transverse direction runs perpendicularly to the vehicle longitudinal direction and to the vehicle vertical direction. In a completely manufactured state of the motor vehicle 12, when the motor vehicle stands on an at least substantially horizontal plane, the vehicle vertical direction runs parallel to the vertical and thus perpendicularly to the horizontal and thus perpendicularly to the horizontal plane, wherein the vehicle transverse direction at least substantially runs parallel to the horizontal and to the horizontal plane and perpendicularly to the vertical. The vehicle longitudinal direction and the vehicle vertical direction span a particularly envisaged plane running perpendicularly to the horizontal and perpendicularly to the horizontal plane, wherein the vehicle vertical direction runs parallel to the notional plane or lies in the notional plane. Because the vehicle longitudinal direction is also labelled with x or as an x-direction, the vehicle transverse direction also with y or as a y-direction and the vehicle vertical direction also as a z-direction or with a z, the notional plane mentioned above is also labelled as an x-z plane.

The electrical axle drive device 10 has at least one first electrical machine 34 which, for example, has a first stator 36 and a first rotor 38, in particular having a shaft 40 also labelled as a rotor shaft. The rotor 38, and thus the shaft 40, are rotatable relative to the stator 36 around a machine axis of rotation 42, in particular relative to the frame 22, wherein the machine axis 42 runs at least substantially in the vehicle transverse direction. In doing so, the machine axis of rotation 42 runs, for example, parallel to the respective wheel axis of rotation, wherein the respective wheel axis of rotation 20 is preferably axially offset from the machine axis of rotation. In other words, the respective wheel axis of rotation 20 and the machine axis of rotation 42 do not coincide, but are rather spaced apart from one another or axially offset from one another.

The electrical axle drive device 10 further comprises a gear unit labelled as a whole with 44, which has at least one of the first planetary gear stages 46 drivable by one of the first electrical machines 34 and at least a first spur gear stage 48 drivable via the first planetary gear stage 46 by the first electrical machine 34. The planetary gear stage 46 has a sun gear 50 as a first gear element, an internal gear 52 as a second gear element and a planetary carrier 54 as a third gear element. In addition, the planetary gear stage 46 has first planetary gears 56, which are respectively rotatably stored on the planetary carrier 54 and mesh on the one hand with the internal gear 52 and with the sun gear 50 on the other. In this regard, the sun gear 50 is mounted coaxially to the rotor 38, in particular to the shaft 40, and is connected, in a manner fixed against rotation, to the shaft 40 and thus to the rotor 38, so that the planetary gear stage 46 is connected via the sun gear 50 to the electrical machine 34. At least the gear elements of the planetary gear stage 46 are arranged in a housing 58, wherein, for example, the internal gear 52 is fixed in a manner fixed against rotation in the housing 58, in particular permanently. The sun gear 50 and the planetary carrier 54 can rotate around a common main axis of rotation relative to the housing 58, in particular when the planetary gear stage 46 is driven. In doing so, the main axis of rotation coincides with the machine axis of rotation 42.

The spur gear stage 48 has a first spur gear 60 and a second spur gear 62 that mesh with one another, in particular via respective toothings, designed as external toothings, so that the spur gear 62 is drivable by the spur gear 60. The spur gear 60 is drivable via the planetary gear stage 46 by the electrical machine 34 so that the spur gear 62 is drivable via the spur gear 60 by the electrical machine 34. The spur gear 60 is thus rotatable around an axis of rotation coinciding with the machine axis of rotation 42, in particular relative to the housing 58 or relative to the frame 22. Preferably, the first planetary gear stage 46, the first electrical machine 34, and at least the spur gear 60, in particular the first spur gear stage 48, are accommodated or arranged in a housing 58 which these components share.

As the following explains in more detail, the drive wheels 14 and 18 are drivable via the gear unit 44, in particular via the spur gear stage 48 and the planetary gear stage 46, by the electrical machine 34, in particular by the rotor 38. In order to drive the drive wheels 14 and 18, and thus the motor vehicle 12 as a whole, the electrical machine 34 is operated in a motor operation and thus as an electric motor. For this purpose, the electrical machine 34 is supplied with electrical energy or with electric current, which is respectively stored in the at least one energy store. The energy store is thus designed as a high-voltage component, in particular as a high-voltage battery, and has, for example, an electrical voltage, in particular operating voltage, of several 100s of volts. In this way, particularly high electrical capacities can be implemented in order to drive the drive wheels 14 and 18.

In order to now be able to implement particularly advantageous operation as well as a particularly compact construction method of the electrical axle drive device, an axle drive 64 of the axle 16 is provided, the axle drive being driven via the gear unit 44 by the electrical machine 34 and being referred to or designed as a differential of differential gear unit, wherein the drive wheels 14 and 18 are drivable or driven via the axle drive 64 and via the gear unit 44 by the electrical machine 34, in particular when the electrical machine 34 is driven in its engine operation. The axle drive 64 is, for example, designed as a bevel-gear differential and allows a torque compensation between drive wheels 14 and 18. In particular, the axle drive 64 allows a torque compensation or different rotational speeds of drive wheels 14 or 18 during cornering, so that—while the drive wheels 14 and 18 are being driven by the electrical machine 34—the outside wheel can rotate with a higher rotational speed than the inside wheel, without resulting in excessive tensioning of the axle drive device 10.

FIG. 1 illustrates a longitudinal central plane 66 spanned by the vehicle vertical direction and the vehicle longitudinal direction, which is also denoted as a vehicle longitudinal central plane or as a vertical longitudinal central plane. The longitudinal central plane 66 runs parallel to the x-z-plane named above or, for example, coincides with this x-z-plane, wherein the longitudinal central plane 66 lies in or on the middle of the axle drive device 10 in relation to the vehicle transverse direction, in particular to the axle 16. The axle drive device 10, in particular the axle 16, has a width B running in a vehicle transverse direction, wherein the middle M of the width B lies in or on the longitudinal central plane 66 with respect to the vehicle transverse direction. In other words, the longitudinal central plane 66 goes through the middle M of width B.

Here, the electrical machine 34 is at least partially, in particular at least predominantly or completely, arranged on a first side 68 of the longitudinal central plane 66 in relation to the longitudinal central plane 66, while the first spur gear stage 48 is at least partially, in particular least predominantly or completely, arranged on a side 70 of the longitudinal central plane 66 opposite the first side 68 in a vehicle transverse direction. As a result, a compact construction method can be implemented, so that the electrical drive device 10 or the electrical machine 34 can be integrated into the frames 22 and thus between the longitudinal carriers 24 and 26 with the gear unit 44 and where appropriate with the axle drive 64, so that, for example, all components of the axle drive device 10 are arranged in a vehicle transverse direction between the longitudinal carriers 24 and 26. The electrical machine 34, the planetary gear stage 46, the spur gear stage 48 or the gear unit 44 as a whole, as well as the axle drive 64, in particular belong to these components of the axle drive device 10, as well as optionally further components which are set out in the following.

One of the further components is, for example, a second planetary gear stage 72 of the gear unit 44 and thus of the axle drive device 10, In particular, it is conceivable that the first planetary gear stage 46 can be omitted, so that with regard to the description, the planetary gear stage 72 becomes the first and for example only planetary gear stage of the axle drive device 10.

The second planetary gear stage 72 comprises a sun gear 74 as a fourth gear element, an internal gear 76 as a fifth gear element and a planetary carrier 78 as a sixth gear element, The planetary gear stage 72 further comprises planetary gears 80, which mesh respectively with the sun gear 74 and with the internal gear 76. In this way, the planetary wheels 80 are rotatably stored on the planetary carrier 78. The second planetary gear stage 72 has at least one switching element 82, which—as set out in the following—functions or can function or is designed as a braking element and/or as a locking element. In the first embodiment shown in FIG. 1, the switching element 82 is designed as the internal gear 76, wherein the internal gear 76 is designed as a displaceable internal gear. This means, in particular, that the internal gear 76 is moveable and thus displaceable in an axial direction of the planetary gear stage 72 relative to the housing 58 or relative to a further housing, in which at least the gear elements of the planetary gear stage 72 are arranged. The switching element 82 or the internal gear 76 is thus moveable or displaceable between a neutral position shown in FIG. 1, at least one locking position and at least one braking position, wherein the neutral position is also a release position and a detachment position of the switching element 82. The further housing is, for example, the housing 58 or another, in particular separate or additional, housing.

In principle, the gear elements of the planetary gear stage 72 are rotatable around a main axis of rotation denoted by 84 in FIG. 1 relative to the housing 58 or relative to the named further housing, in which the gear elements of the planetary gear stage 72 are arranged, wherein the main axis of rotation 84 runs, for example, at least substantially parallel to the main axis of rotation of the planetary gear stage 46, wherein the main axes of rotation are preferably spaced apart from one another or axially offset from one another. In addition, the main axis of rotation 84 is arranged to be axially offset from the machine axis of rotation 42 and the wheel axes of rotation 20.

The axial displaceability of the switching element 82 is indicated by a double arrow 86 in FIG. 1. Starting from the neutral position shown in FIG. 1, the switching element 82, that is to say the internal gear 76 in an axial direction of the planetary gear stage 72, can, for example, be moved to the left into the braking position named above, wherein the axial direction of the planetary gear stage 72 coincides with the main axis of rotation 84. In the braking position, the internal gear 76 is fixed rotatably to the housing 58 or to the further housing, so that the internal gear 76 no can no longer rotate around the main axis of rotation 84 relative to the housing 58 or relative to the further housing, in particular when the planetary gear stage 72 is driven. In order to improve readability, in the following, only the housing 58 is discussed, wherein the further housing can also be understood to be included as part of the housing 56.

In order to move, for example, the switching element 82 or the internal gear 76 starting from the neutral position shown in FIG. 1 into the locking position, the switching element 82 or the internal gear 76 is displaced to the right in an axial direction of the planetary gear stage 72 relative to the housing 58. In the locking position, the internal gear 76 interlocks with the sun gear 74 of the planetary gear stage 72 via the spur gear 62, so that, for example, when the planetary gear stage 72 is driven, the internal gear 76 and the sun gear 74 rotate as a block and thus together around the main axis of rotation 84 relative to the housing 58. For this purpose, a shifting engagement 88 is, for example, provided on the spur gear 62, with which the internal gear 76, in particular via its inner toothing, cooperates in the locking position in an interlocking manner, whereby the internal gear 76 interlocks with the sun gear 74 via the spur gear 62. Thus, the internal gear 76 and the sun gear 74 also interlock with the spur gear 62. In this way, the sun gear 74 is arranged coaxially to the spur gear 62 and is connected to the spur gear 62 in a manner fixed against rotation, whereby the planetary gear stage 72 is connected to the spur gear stage 48. The spur gear stage 48 is further connected to the planetary carrier 54 and thus to the planetary gear stage 46 via the spur wheel 60, wherein the spur wheel 60 is arranged coaxially to the planetary carrier 54 and is connected thereto in a manner fixed against rotation.

In the neutral position, designed as a release position or as a detachment position, the switching element 82 releases the internal gear 76 for a respective rotation relative to the housing 58 and relative to the sun gear 74 around the main axis of rotation 84, so that, for example, when the planetary gear stage 72 is driven, i.e., when torques are introduced into it, the internal gear 76 can rotate around the main axis of rotation 84 relative to the housing 58 and relative to the sun wheel 74. If, for example, the motor vehicle 12 is standing on a surface or road via the drive wheels 14 and 18, the drive wheels 14 and 18 will be braked, so that they are secured against a rotation relative to the frame 22 around the wheel axes of rotation 20; if the switching element 82 is in the neutral position, the planetary gear stage 72 will be driven, as, for example, the electrical machine 34 is running and supplies at least one, in particular low, drive torque, which is introduced to the planetary gear stage 72 via the planetary gear stage 46 and the spur gear stage 48, the electrical machine 34 will be running or the electrical machine 34 will be operated in its engine operation, yet a driving of the drive wheels 14 and 18 and thus of the motor vehicle 12 as a whole is prevented and the drive wheels 14 and 18 do not conflict then with engine operation of the electrical machine 34, so that the electrical machine 34 can be driven in its engine operation with a small load. The planetary carrier 78 is, for example, held in place by the braked drive wheels 14 and 18 so that, for example, the internal gear 76, the sun gear 74, the spur gear stage 48, and the planetary gear stage 46 can be rotated via the planetary gear 80 by the electrical machine 34 in a simple way, that is to say, with only a small load or with only a small torque, in particular around the main axis of rotation 84 relative to the housing 58. In this way, the electrical machine can run with only a small load—without the drive wheels 14 and 18 being driven—so that, for example, an advantageous cooling of the electrical machine 34 can be maintained, without the motor vehicle 12 being driven. In this way, an idling of the axle drive device 10 is practicable, so that the switching element 82 or the internal gear 76 is moved into the neutral position. Due to the further possibility of moving the switching element 82 into the braking position and into the locking position, at least two transmissions, in particular transmissions differing from one another, can be represented by the braking position and by the locking position, via which the wheels 14 and 18 can be driven by the electrical machine 34. Through this practicability of the at least two transmissions, in particular transmissions differing from one another, at least two gears of the electrical axle drive device can be created in a simple and space-efficient manner, wherein these switchable gears differ from one another, for example, in their transmissions. A first of the gears is, for example, then inserted when the switching element 82 is in its braking position. A second of said gears is, for example, inserted when the switching element 82 is in its locking position.

To move the switching element 82 between the neutral position, the locking position, and the braking position, an actor which is not shown in the figures is provided, by means of which the switching element 82 can be displaced in an axial direction of the planetary gear stage 72 or along the main axis of rotation 84 relative to the housing 58.

In order to implement a particularly advantageous transmission, in particular an overall transmission of the axle drive device 10 or the gear unit 44 in a space-efficient manner, the gear unit 44 has a second spur gear stage 90. The second spur gear stage 90 has a third spur gear 92 and a fourth spur gear 94 that meshes with the third spur gear 92, which, for example, is drivable by the electrical machine 34 via the spur gear 92, the planetary gear stage 72, the spur gear stage 48, and the planetary gear stage 46. The planetary gear stage 72 is arranged on the spur gear stage 48 in such a way that—as explained previously—the sun wheel 74 is arranged coaxially to the spur gear 62 and is connected in a manner fixed against rotation with the spur gear 62. In addition, the planetary gear stage 72 is connected to the spur gear stage 90 in such a way that the spur gear 92 is arranged coaxially to the planetary carrier 78 and is connected in a manner fixed against rotation with the planetary carrier 78.

In the first embodiment, it is provided that, in relation to a torque flow from the electrical machine 34 to the respective drive wheel 14 or 18, the first planetary gear stage 46 is arranged after the first electrical machine 34 and before the drive wheel 14, the first spur gear stage 48 is arranged after the first planetary gear stage 46 and in front of the drive wheel 14, the second planetary gear stage 72 is arranged after the first spur gear stage 48 and before the drive wheel 14, and the second spur gear stage 90 is arranged after the second planetary gear stage 72 and before the drive wheel 14 or 18.

Here, the second planetary gear stage 72 is arranged at least partially, in particular at least predominantly or completely, on the second side 70. In addition, the second spur gear stage 90 is arranged in or on the longitudinal central plane 66, so that the longitudinal central plane 66 runs through the middle of the spur gears 92 and 94 in relation to the vehicle transverse direction.

In addition, the electrical machine 34 is arranged with at least two thirds, in particular of its volume or its external dimensions, on the first side 68. In other words, the electrical machine 34 is at least partially, in particular at least predominantly or completely, arranged on the first side 68.

Here, the planetary gear stage 72 and the spur gear stage 90 can belong to the further components of the axle drive device 10 named above, which are arranged between the longitudinal carriers 24 and 26 in the vehicle transverse direction. In addition, it is conceivable for the axle drive 64 to be on the components of the axle drive device 10.

A differential lock 96, for example, can also further belong to the further components of the axle drive device 10, the differential lock having at least one locking element 98. As shown in FIG. 1 by a double arrow 100, the locking element 98 can, for example, be displaced in the axial direction of the axle drive 64 along the respective wheel axis of rotation 20 and, thereby, be moved between a locked state and an unlocked state, wherein the function of the differential lock 96, which, for example, is designed as an electronic differential lock, is sufficiently known from the general prior art.

It is further recognizable that, for example, the spur gear 94 can replace a ring gear, the ring gear being usually provided by a differential, so that, for example, the spur gear 94 is connected in a manner fixed against rotation with a differential cage 102, so that the differential cage 102 can be driven by the spur gear 94 and thus is rotatable around the respective wheel axis of rotation 20, in particular, relative to the frame 22. In this way, the pinion gears 104 of the axle gear 94 can be driven via the differential cage 102 in a sufficiently known manner. Via the pinion gears 104, the drive wheels 106 can be driven again, wherein the drive wheels 106 and the pinion gears 104 are designed, for example, as bevel gears, which mesh with one another. The drive wheels 106 are, for example, connected in a manner fixed against rotation with the side shaft 108, denoted also as a drive shaft, via which the drive wheels 14 and 18 can be driven.

Figure 2:
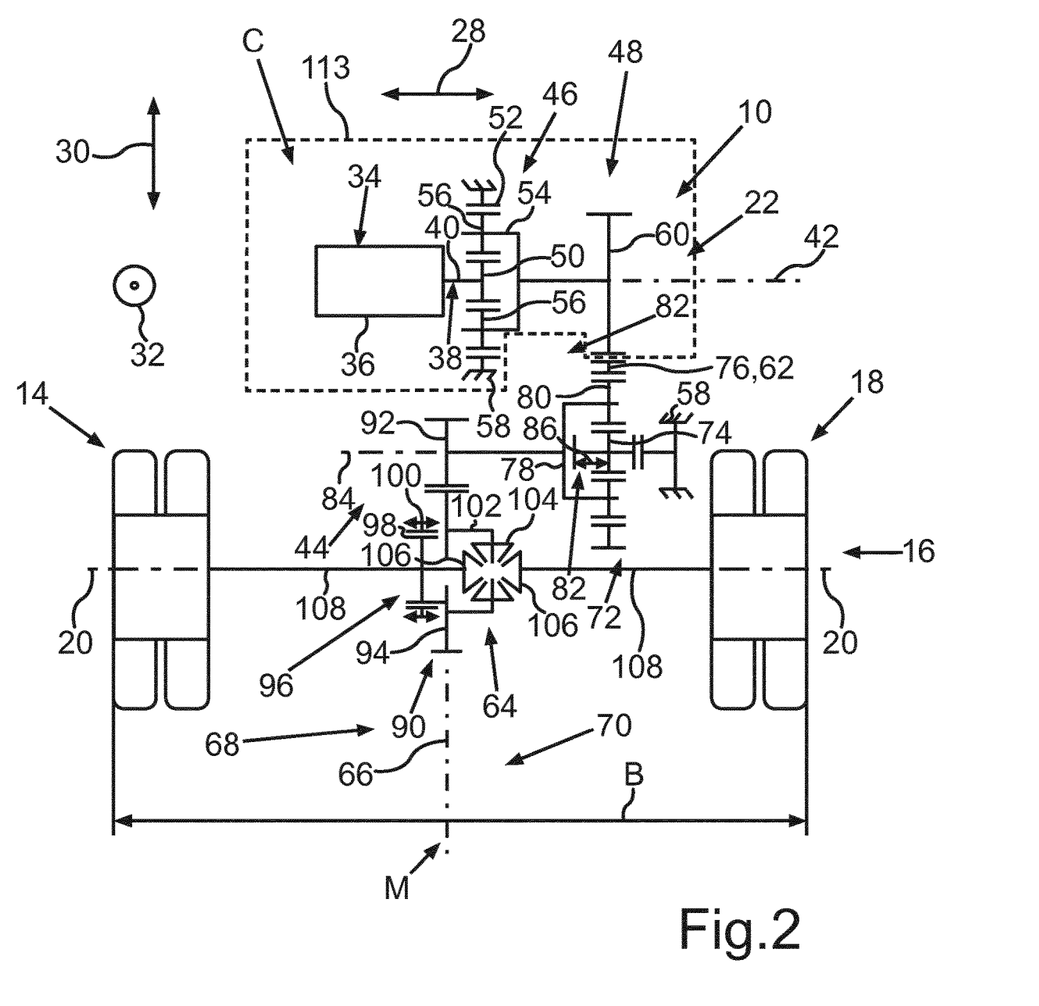
FIG. 2 a schematic representation of the electrical axle drive device according to a second exemplary embodiment.

FIG. 2 shows a second embodiment of the axle drive device 10. The second embodiment differs from the first embodiment in that the switching element 82 is not designed as a displacing internal gear, but rather as a displacing sun gear. The displacing sun gear is also denoted as a displacing sun and is the sun gear 74, which is moveable in an axial direction of the planetary gear stage 72 and thus along the main axis of rotation 84 relative to the housing 58 and thus between the neutral position, the braking position, and the locking position. The idling described above is set the neutral position, so that the electrical machine 34 runs with only a low load, i.e., it can be operated in the engine operation, without the drive wheels 14 and 18 being driven. In the braking position, the right position in the representation in FIG. 2, the sun gear 74 is braked, and thus attached in a manner fixed against rotation to the housing 58. In the locking position, the left position in the representation in FIG. 2, the sun gear 74 is, for example, locked with the planetary carrier 78, so that when the planetary gear stage 72 is driven, the sun gear 74 and the planetary carrier 78 rotate as a block, and thus together, around the main axis of rotation 84.

The embodiments of FIG. 1 and FIG. 2 represent respectively an ideal overall system with respect to a packaging of components of the electrical drive device 10, of an electrical power and of a gear transmission of the electrical axle drive device.

Figure 3:
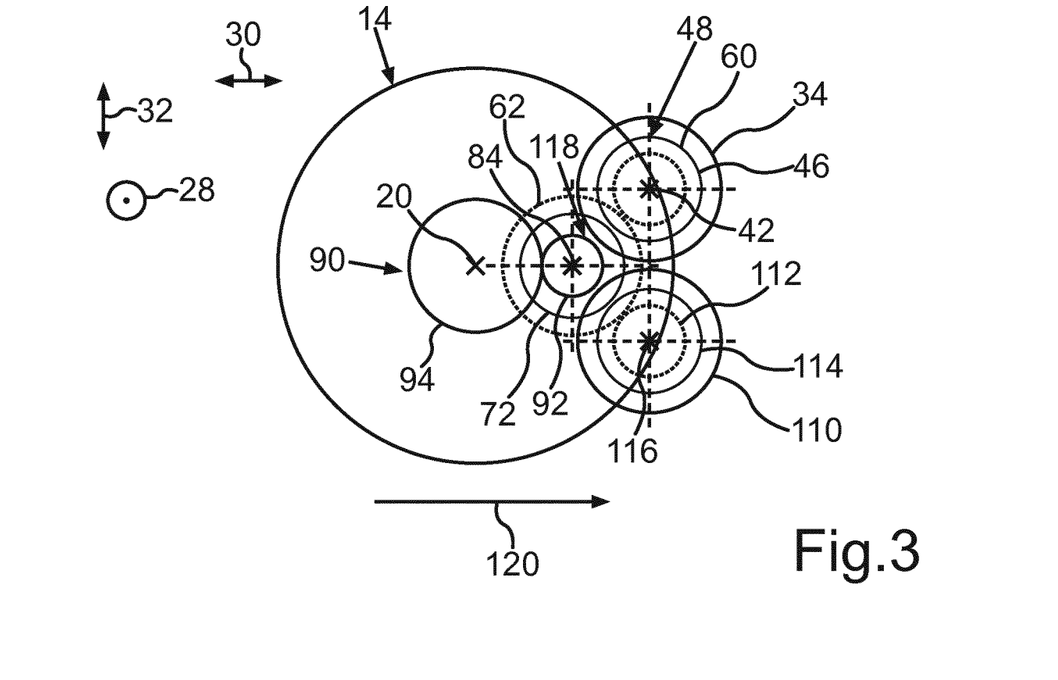
FIG. 3 a schematic side view of the electrical axle drive device according to a third exemplary embodiment.
Figure 4:
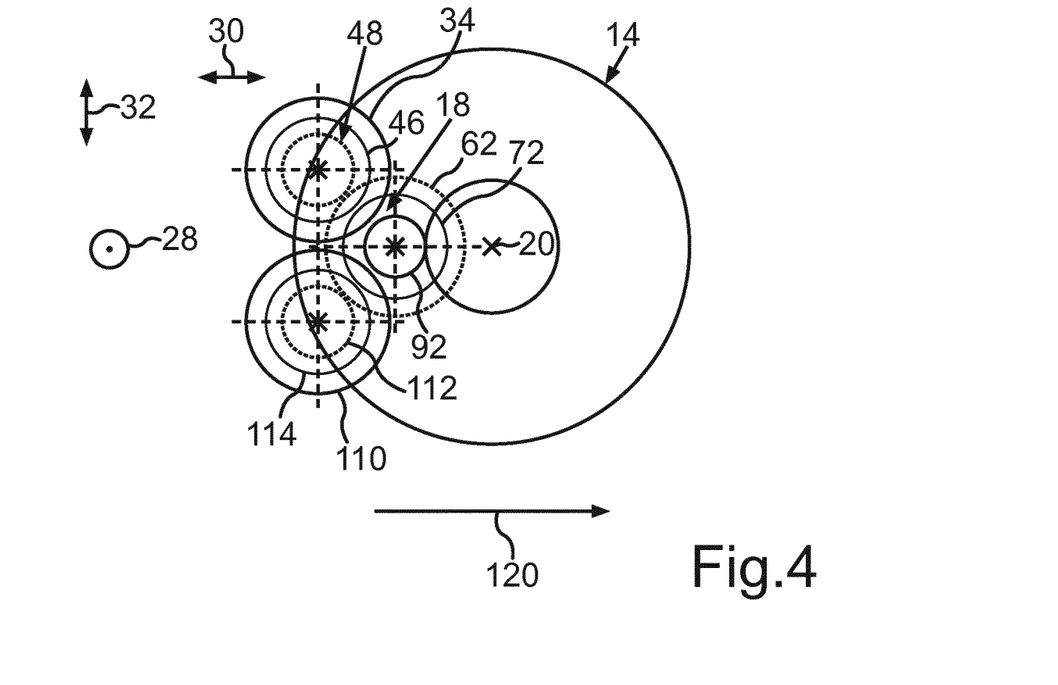
FIG. 4 a schematic side view of the electrical axle drive device according to a fourth exemplary embodiment.

FIG. 3 shows a third embodiment, wherein FIG. 4 shows a fourth embodiment. It is recognizable from FIGS. 3 and 4 that the axle drive device 10 can have a second electrical machine 110, wherein the previous and following embodiments of the first electrical machine 34 can also be easily applied to the second electrical machine 110 and vice versa. In FIGS. 1 and 2 respectively, a dashed line is shown which surrounds a region C of FIG. 1 or of FIG. 2. Components in the form of the electrical machine 34, the planetary gear stage 46 and the spur gear 60 are shown or contained in this region C, wherein the components shown or represented in region C can be advantageously provided twice, which is shown in FIGS. 3 and 4. Thus, a third planetary gear stage is allocated to the second electrical machine 110, to which the previous and following embodiments that relate to the electrical machine 34 and the spur gear 60 can be easily applied, but in relation to the second electrical machine 110 and to a further spur gear 112, which is drivable by the second electrical machine 110 via the third planetary gear stage denoted with 114 in FIG. 3. From FIG. 3 it is thus recognizable that the further spur gear 112 meshes with the second spur gear 62 of the first spur gear stage 48, so that for example the further spur gear 112 belongs to the first spur gear stage 48.

As the following and previous embodiments of the electrical machine 34 can be easily applied to the second electrical machine 110 and vice versa, the second electrical machine 110 also has, for example, a second stator and a second rotor that is rotatable around a further machine axis of rotation 116 relative to the second stator. In this regard, the respective rotor is drivable by the respective stator and is thus rotatable around the respective machine axis of rotation 42. From FIG. 3 can be recognized particularly well that the machine axis of rotation 116 is axially offset from the machine axis of rotation 42, from the main axis of rotation 84 and from the wheel axis of rotation 20. In this way, the main axis of rotation 84 and the wheel axis of rotation 20 lie, for example, in a plane spanned by the vehicle transverse direction and the vehicle longitudinal direction, the plane running thus at least substantially perpendicularly to the vehicle vertical direction. Further, the machine axes of rotation 42 and 116 lie in a common plane running, for example, perpendicularly to the vehicle longitudinal direction and spanned by the vehicle vertical direction and the vehicle transverse direction, wherein in particular the second electrical machine 110 is aligned with the first electrical machine 34 along a direction running perpendicularly to the vehicle transverse direction, in particular along the vehicle vertical direction. In addition, the electrical machines 34 and 100 are arranged in the vehicle vertical direction one above the other, wherein they are, for example, arranged congruently in such a way that the electrical machine 110 is completely covered upwards in the vehicle vertical direction by the electrical machine 34, while the electrical machine 34 is completely covered downwards in a vehicle vertical direction by the electrical machine 110.

In addition, the electrical machines 34 and 110 create an interstice 118 in which at least a part of the spur gear 92 is arranged, so that the spur gear 92, in particular the named part of the spur gear 92, is covered upwards in the vehicle vertical direction by the electrical machine 34, and is covered downwards in the vehicle vertical direction by the electrical machine 110.

Further, the forward direction of travel of the motor vehicle 12 is shown by an arrow 120. In the third embodiment shown in FIG. 3, the electrical machines 34 and 110 are arranged in front of the drive wheel 14 or 18 or in front of the wheel axis of rotation 20, wherein the electrical machine 34 and 110 are arranged behind the drive wheel 14 or being the wheel axis of rotation in the fourth embodiment shown in FIG. 4.

Compared with the embodiments of FIGS. 1 and 2, the embodiments of FIG. 3 and FIG. 4 represent developments of the overall system of the electrical axle drive device 10. It is in particular advantageous to install two electrical machines 34, 110 in the special arrangement shown together with the gear stages shown in their special arrangement for the purpose of a performance improvement.

FIG. 5 partially shows the motor vehicle 12 in a schematic plan view, wherein the integration of the axle drive device 10 between the longitudinal carriers 24 and 26. can be seen particularly well in FIG. 5. In FIG. 5, 122 marks a construction space available, in particular in the third embodiment, in which, for example, power electronics and/or at least one cooler as well as for example oil and/or water ports can be arranged. The cooler is, for example, a heat exchanger and/or an oil and/or water cooler.

In addition, in FIG. 5 124 marks a construction space available, in particular, in the fourth embodiment in which, for example, power electronics and/or at least one cooler designed as a heat exchanger and, where appropriate, oil and/or water ports can be arranged, wherein the previous and following embodiments of the construction space 122 can also be applied to the construction space 124 and vice versa. Thus, it is possible that a cooler, in particular an oil cooler, and/or power electronics is arranged on a side of the first electrical machine 34 facing away from the axle drive 64 or on a side of the axle drive 64 facing away from the first electrical machine 34.

Where appropriate, the first planetary gear stage 46 can be omitted, so that, with regard to the description or in terms of the conceptual technology, the second planetary gear stage 72 is denoted as a first planetary gear stage and is provided, for example, as the only planetary gear stage. It is further conceivable that only one of the electrical machines 34 and 110 is provided in the axle drive device 10 so that, for example, exactly one electrical machine 34 or 110 is provided. Due to this, a sufficiently advantageous drive of the drive wheels 14 and 18 with a sufficient performance can be achieved.

In addition, in FIG. 5 an actuator system 126 is, for example, recognizable, by means of which, for example, the switching element 82 is moveable, in particular displaceable, so that, for example, the actuator system 126 of the previously mentioned actuator is for moving or displacing the switching element 82.

Finally, FIG. 6 shows the motor vehicle 12 sectionally in a schematic side view, wherein the placing of the electrical machines 34 and 110 arranged one on top of the other is particularly well recognizable from FIG. 6. In addition, a stabilizing carrier 128 is recognizable from FIG. 6.

As a whole, it is recognizable from the figures that the axle 16 designed, for example, as a front axle or a rear axle can be driven particularly advantageously as well as space-efficiently by means of the electrical machines 34 and 110, which can be operated as electric motors, wherein the respective planetary gear stage 46 or 114 designed as planetary gears is directly flange-mounted onto the respective electrical machine 34 or 100, and thus forming, with the respective electrical machine 34 or 110, for example, a particularly easily manageable and mountable module. Via the spur gear stage 48 following the electrical machines 34 and 110, in particular the planetary gear stages 46 and 114, the respective torques provided by the electrical machines 34 and 110 and which are also denoted as drive torques can be combined on the spur gear 62, since the spur gear 60 as well as the spur gear 112 meshes with the spur gear 62. The second planetary gear stage 72 follows the spur gear 62 and thus the spur gear stage 48, which can be optionally switchable. In this way, different transmissions as well as the neutral position can be achieved.

A further difference between the second and first embodiment is that—while in the first embodiment, the second planetary gear stage 72 is connected to the spur gear stage 48 via the sun gear 74 in the manner described—in the second embodiment, the second planetary gear stage 72 is connected to the first spur gear stage 48 via the internal gear 76. For this purpose, the internal gear 76 has its internal toothing, via which the internal gear 76 meshes with the planetary gears 80. Further, the internal gear 76 has an external toothing, which the spur gear 62 is formed by. The internal gear 76 or the spur gear 62 thus meshes via the external toothing of the internal gear 76 with the spur gear 60. Thus, in the first embodiment, the sun gear 74 represents an actuator of the planetary gear stage 72, wherein in the second embodiment, the actuator of the planetary gear stage 72 is implemented by the internal gear 76. In the first embodiment and in the second embodiment, the planetary carrier 78 is an actuator of the planetary gear stage 72, which is connected via the actuator to the second spur gear stage 90. The spur gear stage 90 is a further or second spur gear group, via which the respective drive torque or the summed drive torques and thus a total torque resulting from the drive torques can be applied to the axle drive 64 designed as a differential.

In addition, it is possible to integrate a differential lock particularly easily. From the axle drive 64, the total torque is applied to the drive wheels 14 and 18 via the side shafts. Through the arrangement of the electrical machines 34 and 110 described and recognizable from the figures as well as of the gear unit 44, to which for example in particular the third planetary gear stage 114 belongs, a given installation space can be used particularly effectively and efficiently as well as, in particular, completely. On the one hand, the construction can be very narrow, in order to come between the longitudinal carriers 24 and 26 at any provided spring bellows and integrate this between the axle drive device 10.

On the other hand, a large local space for a stabilizer and/or a wishbone can be achieved. In addition, it is possible to arrange the electrical machines 34 and 110 in front of (FIG. 3) or behind (FIG. 4) the axis 16 or the wheel axis of rotation 20. In this way, one can comply with possible construction space restrictions, or space is created for an energy store, power electronics, air conditioning technology and/or other construction elements.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

| List of reference numerals | |
|---|---|
| 10 | Axle drive device |
| 12 | Motor vehicle |
| 14 | Drive wheel |
| 16 | Axle |
| 18 | Drive wheel |
| 20 | Wheel axis of rotation |
| 22 | Frame |
| 24 | Longitudinal carrier |
| 26 | Longitudinal carrier |
| 28 | Vehicle transverse direction |
| 30 | Chevron |
| 32 | Vehicle vertical direction |
| 34 | First electrical machine |
| 36 | Stator |
| 38 | Rotor |
| 40 | Shaft |
| 42 | Machine axis of rotation |
| 44 | Gear unit |
| 46 | First planetary gear stage |
| 48 | First spur gear stage |
| 50 | Sun gear |
| 52 | Internal gear |
| 54 | Planetary carrier |
| 56 | Planetary gear |
| 58 | Housing |
| 60 | First spur gear |
| 62 | Second spur gear |
| 64 | Axle drive |
| 66 | Longitudinal central plane |
| 68 | First side |
| 70 | Second side |
| 72 | Second planetary gear stage |
| 74 | Sun gear |
| 76 | Internal gear |
| 78 | Planetary carrier |
| 80 | Planetary gear |
| 82 | Switching element |
| 84 | Main axis of rotation |
| 88 | Shifting engagement |
| 90 | Second spur gear stage |
| 92 | Third spur gear |
| 94 | Fourth spur gear |
| 96 | Differential lock |
| 98 | Locking element |

| List of reference numerals | |
|---|---|
| 100 | Chevron |
| 102 | Differential carrier |
| 104 | Pinion gear |
| 106 | Drive wheel |
| 108 | Side shaft |
| 110 | Second electrical machine |
| 112 | Further spur gear |
| 113 | Line |
| 114 | Third planetary gear stage |
| 116 | Second machine axis of rotation |
| 118 | Interstice |
| 120 | Shaft |
| 122 | Installation space |
| 124 | Installation space |
| 126 | Actuator system |
| 128 | Stabilizing carrier |
| B | Width |
| C | Area |
| M | Middle |

The invention claimed is:

1. An electrical axle drive device for a motor vehicle, the electrical axle drive device comprising:
at least one first electrical machine, which has a stator and a rotor, wherein the rotor is rotatable around a machine axis of rotation relative to the stator;
a gear unit configured to be driven by the first electrical machine, the gear unit comprising
exactly two planetary gear stages configured to be driven by the at least one first electrical machine, wherein the exactly two planetary gear stages comprises a first planetary gear stage and a second planetary gear stage; and
exactly two spur gear stages, wherein the exactly two spur gear stages comprises a first spur gear stage and a second spur gear stage, wherein the first spur gear stage is configured to be driven by the at least one first electrical machine, wherein first spur gear stage includes a first spur gear and a second spur gear meshing with the first spur gear;
at least one drive wheel of the motor vehicle, the at least one drive wheel is rotatable around a wheel axis of rotation running parallel to the machine axis of rotation and is configured to be driven by the at least one first electrical machine via the gear unit;
an axle drive configured to be driven by the at least one first electrical machine via the gear unit, wherein the at least one drive wheel is configured to be driven by the at least one first electrical machine via the axle drive; and
a braking element, configured so that a gear element of the first planetary gear stage or a gear element of the second planetary gear stage is fixable to a housing of the gear unit, wherein the braking element has an internal gear that is displaceable in a axial direction of the secondary planetary gear stage relative to the housing,
wherein the at least one first electrical machine is arranged at least partially on a first side of a longitudinal central plane of the motor vehicle, wherein the longitudinal central plane is spanned by a vehicle vertical direction and a vehicle longitudinal direction,
wherein the first spur gear stage is arranged on a second side of the longitudinal central plane opposite the first side in a vehicle transverse direction, and
wherein, in relation to a torque flow from the at least one first electrical machine to the at least one drive wheel, the first planetary gear stage is arranged after the at least one first electrical machine and before the at least one drive wheel, the first spur gear stage is arranged after the first planetary gear stage and before the at least one drive wheel, the second planetary gear stage is arranged after the first spur gear stage and before the at least one drive wheel, and the second spur gear stage is arranged after the second planetary gear stage and before the at least one drive wheel.

2. The electrical axle drive device of claim 1, further comprising:
at least one locking element configured to lock at least two gear elements of the second planetary gear stage with one another.

3. The electrical axle drive device of claim 1, wherein the second planetary gear stage is predominantly arranged on the second side.

4. The electrical axle drive device of claim 1, wherein the second gear stage is arranged substantially on the longitudinal central plane.

5. The electrical axle drive device of claim 1, wherein the at least one electrical machine is arranged with at least two thirds of its volume on the first side.

6. The electrical axle drive device of claim 1, further comprising:
a second electrical machine; and
a further spur gear, wherein the further spur gear is drivable by the second electrical machine and meshes with the second spur gear.

7. The electrical axle drive device of claim 6, wherein the second electrical machine is arranged on a third side of a further plane of the motor vehicle, wherein the further plane of the motor vehicle is spanned by the vehicle transverse direction and the vehicle longitudinal direction, wherein the at least one first electrical machine is arranged on a fourth side of the further plane opposite the third side in the vehicle vertical direction.

8. The electrical axle drive device of claim 6, wherein the second electrical machine is aligned with the at least one first electrical machine along a direction running perpendicular to the vehicle transverse direction.

9. The electrical axle drive device of claim 1, wherein the first planetary gear stage, the at least one first electrical machine, and the first spur gear stage are arranged in a common housing, wherein the common housing is arranged so that it equally spans the first side and the second side.

10. The electrical axle drive device of claim 1, wherein an oil cooler and power electronics are arranged on a side of the at least one first electrical machine facing away from the axle drive.

11. The electrical axle drive device of claim 1, further comprising:
a second drive wheel;
a rigid axle device, wherein the at least one drive wheel and the second drive wheel are connected to one another via the rigid axle device; and
a partial housing configured to accommodate the gear unit, wherein the partial housing has a flange connected or contactable with a second flange of the axle drive.

12. A commercial motor vehicle, comprising:
an electrical axle drive, which comprises
at least one first electrical machine, which has a stator and a rotor, wherein the rotor is rotatable around a machine axis of rotation relative to the stator;

a gear unit configured to be driven by the first electrical machine, the gear unit comprising
  exactly two planetary gear stages configured to be driven by the at least one first electrical machine, wherein the exactly two planetary gear stages comprises a first planetary gear stage and a second planetary gear stage; and
  exactly two spur gear stages, wherein the exactly two spur gear stages comprises a first spur gear stage and a second spur gear stage, wherein the first spur gear stage is configured to be driven by the at least one first electrical machine, wherein first spur gear stage includes a first spur gear and a second spur gear meshing with the first spur gear;
at least one drive wheel of the motor vehicle, the at least one drive wheel is rotatable around a wheel axis of rotation running parallel to the machine axis of rotation and is configured to be driven by the at least one first electrical machine via the gear unit;
an axle drive configured to be driven by the at least one first electrical machine via the gear unit, wherein the at least one drive wheel is drivable by the at least one first electrical machine via the axle drive; and
a braking element, configured so that a gear element of the first planetary gear stage or a gear element of the second planetary gear stage is fixable to a housing of the gear unit, wherein the braking element has an internal gear that is displaceable in a axial direction of the secondary planetary gear stage relative to the housing,
wherein the at least one first electrical machine is arranged at least partially on a first side of a longitudinal central plane with respect to a longitudinal central plane of the motor vehicle that is spanned by a vehicle vertical direction and a vehicle longitudinal direction,
wherein the first spur gear stage is arranged on a second side of the longitudinal central plane opposite the first side in a vehicle transverse direction, and
wherein, in relation to a torque flow from the at least one first electrical machine to the at least one drive wheel, the first planetary gear stage is arranged after the at least one first electrical machine and before the at least one drive wheel, the first spur gear stage is arranged after the first planetary gear stage and before the at least one drive wheel, the second planetary gear stage is arranged after the first spur gear stage and before the at least one drive wheel, and the second spur gear stage is arranged after the second planetary gear stage and before the at least one drive wheel,
wherein the electrical axle drive device further comprises
  a second electrical machine; and
  a further spur gear, wherein the further spur gear is drivable by the second electrical machine and meshes with the second spur gear;
two longitudinal carriers, wherein the exactly two planetary gear stages, the exactly two spur gear stages, and the first and the second electrical machines are all arranged in the vehicle transverse direction between the longitudinal carriers,
wherein the first and the second electrical machines are the only drive machines of the electrical axle drive.

13. An electrical axle drive device for a motor vehicle, the electrical axle drive device comprising:
at least one first electrical machine, which has a stator and a rotor, wherein the rotor is rotatable around a machine axis of rotation relative to the stator;
a gear unit configured to be driven by the at least one first electrical machine, the gear unit comprising
  exactly two planetary gear stages, wherein the exactly two planetary gear stages comprises a first planetary gear stage and a second planetary gear stage; and
  exactly two spur gear stages, wherein the exactly two spur gear stages comprises a first spur gear stage and a second spur gear stage, wherein the first gear stage is configured to be driven by the first electrical machine, wherein the first spur gear stage includes a first spur gear and a second spur gear meshing with the first spur gear;
at least one drive wheel of the motor vehicle, wherein the at least one drive wheel is rotatable around a wheel axis of rotation running parallel to the machine axis of rotation and is configured to be driven by the at least one first electrical machine via the gear unit;
an axle drive configured to be driven by the at least one first electrical machine via the gear unit, wherein the at least one drive wheel is configured to be driven by the at least one first electrical machine; and
a braking element configured to attach a gear element of the second planetary gear stage to a housing of the gear unit, wherein the braking element has a sun gear of the second planetary gear stage switchable in a axial direction of the second planetary gear stage relative to the housing;
wherein the at least one first electrical machine is arranged at least partially on a first side of a longitudinal central plane of the motor vehicle, wherein the longitudinal central plane is spanned by a vehicle vertical direction and a vehicle longitudinal direction,
wherein the first spur gear stage is arranged on a second side of the longitudinal central plane opposite the first side in a vehicle transverse direction, and
wherein, in relation to a torque flow from the first electrical machine to the at least one drive wheel, the first planetary gear stage is arranged after the at least one first electrical machine and before the at least one drive wheel, the first spur gear stage is arranged after the first planetary gear stage and before the at least one drive wheel, the second planetary gear stage is arranged after the first spur gear stage and before the at least one drive wheel, and the second spur gear stage after the second planetary gear stage and before the at least one drive wheel.

* * * * *